United States Patent
Quest

(10) Patent No.: US 9,933,318 B2
(45) Date of Patent: *Apr. 3, 2018

(54) THERMOCHROMIC CLIP FOR SENSING TEMPERATURE OF AIR FLOWING THROUGH A VENT IN AN AIR CONDITIONING SYSTEM

(71) Applicant: Michael E. Quest, Arden, NC (US)

(72) Inventor: Michael E. Quest, Arden, NC (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/793,769

(22) Filed: Jul. 8, 2015

(65) Prior Publication Data

US 2016/0011059 A1    Jan. 14, 2016

Related U.S. Application Data

(60) Provisional application No. 62/022,821, filed on Jul. 10, 2014.

(51) Int. Cl.
*G01K 11/16*    (2006.01)
*G01K 1/14*    (2006.01)
*G01K 13/02*    (2006.01)

(52) U.S. Cl.
CPC ............... *G01K 11/16* (2013.01); *G01K 1/14* (2013.01); *G01K 13/02* (2013.01); *G01K 2013/024* (2013.01); *G01K 2201/02* (2013.01)

(58) Field of Classification Search
CPC combination set(s) only.
See application file for complete search history.

(56) References Cited

U.S. PATENT DOCUMENTS

| 5,168,721 | A | * | 12/1992 | Hancock | F25B 45/00 |
| | | | | | 62/292 |
| 5,996,357 | A | | 12/1999 | Park | |
| 6,085,530 | A | | 7/2000 | Barito | |
| 6,185,945 | B1 | * | 2/2001 | Pfefferle | B60H 1/00585 |
| | | | | | 62/149 |
| 8,115,182 | B1 | * | 2/2012 | Patel | G01T 1/04 |
| | | | | | 250/482.1 |
| 2002/0043261 | A1 | * | 4/2002 | Leutner | F24C 15/04 |
| | | | | | 126/388.1 |

(Continued)

OTHER PUBLICATIONS

Nternational Searching Authority; Korean Intellectual Property Office; Written Opinion of the International earch Authority; dated Oct. 23, 2015; Application PCT/US2015-039637.

*Primary Examiner* — Lisa Caputo
*Assistant Examiner* — Nasir U Ahmed
(74) *Attorney, Agent, or Firm* — The Van Winkle Law Firm; William G. Heedy; David M. Carter

(57) ABSTRACT

A thermochromic clip provides a visual indication of the temperature of the air flowing through an air vent as refrigerant is introduced into an air conditioning system. The thermochromic clip including an elongate body having an outer facing surface; a fastening member on the elongate body. The fastening member being sized and configured for selective attachment to the air vent. At least the outer facing surface coated with a thermochromic material. The thermochromic material of the outer facing surface being structured and disposed for changing from a first color state to a second color state in response to a change in temperature that places the thermochromic material at a temperature equal to or below a predetermined temperature value.

9 Claims, 4 Drawing Sheets

(56) References Cited

U.S. PATENT DOCUMENTS

| | | |
|---|---|---|
| 2006/0130733 A1 | 6/2006 | Linke et al. |
| 2006/0137367 A1* | 6/2006 | Galante ................ F25B 45/00 62/149 |
| 2007/0046452 A1 | 3/2007 | Anderson, Jr. et al. |
| 2007/0119963 A1* | 5/2007 | DiBello ................ A61L 9/127 239/34 |

* cited by examiner

US 9,933,318 B2

THERMOCHROMIC CLIP FOR SENSING TEMPERATURE OF AIR FLOWING THROUGH A VENT IN AN AIR CONDITIONING SYSTEM

RELATED APPLICATION

This application is a Non-provisional Patent Application relating to and claiming the benefit of U.S. Provisional Patent Application Ser. No. 62/022,821 filed on Jul. 10, 2014.

FIELD OF THE INVENTION

This invention relates to a device for visually indicating the output temperature of an air conditioning unit and, more particularly, to a thermochromic clip securable to a vent for visually indicating one or more temperature output ranges.

BACKGROUND OF THE INVENTION

For many years, automobile air conditioners have included an orifice tube or expansion valve. Because an expansion valve is essentially a fixed valve with free flow of the refrigerant, the pressure as measured on both the high and low side is a function of both the amount of refrigerant therein, as well as the ambient temperature. A suitable pressure range for the correct refrigerant fill was established many years ago, which is based on increasing the pressure as the ambient temperature rises. More recently, automobile manufacturers have started using thermostatic expansion valves that are designed to meter, or restrict, the flow of refrigerant into the evaporator, thereby providing more efficient cooling by controlling the super heating at the evaporator outlet. The control of the metering is located at the outlet of the evaporator. These automobile manufacturers use the evaporator outlet temperature, independent of the ambient temperature, to regulate the thermostatic expansion valves which meters the refrigerant flow and sets a maximum predetermined pressure at the evaporator outlet.

For systems using a thermostatic expansion valve, as refrigerant is added during servicing, the pressure on the low side rises until it reaches this predetermined maximum level. If this pressure level is below the gauge's established correct fill range, even if the system is fully charged, adding additional refrigerant will not bring the pressure reading up to gauge's established fully charge pressure reading. As additional refrigerant is added, the excessive pressure builds up on the high side and can only be measured using a high side gauge. Because the fully charged pressure using a thermostatic expansion valve remains constant and the gauge's fully charged requirement rises as the ambient temperature goes up, the higher the ambient temperature the larger the gap between the system being fully charged and it showing fully charged on the low side gauge. In these cases, using only a low side gauge can potentially cause too much refrigerant to be added and result in damage to the compressor or other problems associated with overcharging.

In light of the problems advanced above, there exists a need for a device for visually indicating when the correct amount of refrigerant has been introduced to an air conditioning system and preventing the problems associated with overfilling an air conditioner with refrigerant.

SUMMARY OF THE INVENTION

In accordance with one form of the present invention, there is provided a thermochromic clip for providing a visual indication of the temperature of the air flowing through an air vent as refrigerant is introduced into an air conditioning system, and the thermochromic clip including an elongate body having an outer facing surface; a fastening member on the elongate body, and the fastening member being sized and configured for selective attachment to the air vent; at least the outer facing surface of the elongate body being coated with a thermochromic material; and the thermochromic material of the outer facing surface being structured and disposed for changing from a first color state to a second color state in response to a change in temperature at places the thermochromic material at a temperature equal to or below a predetermined temperature value.

In accordance with another form of the present invention, there is provided a kit for providing a visual indication of the temperature of the air flowing through an air vent as refrigerant is introduced into an air conditioning system, wherein the kit includes a first thermochromic clip and a second thermochromic clip, and each of the first and second thermochromic clips including an elongate body having an outer facing surface; a fastening member on the elongate body, and the fastening member being sized and configured for selective attachment to the air vent; at least the outer facing surface of the elongate body being coated with a thermochromic material; and the thermochromic material of the outer facing surface being structured and disposed for changing from a first color state to a second color state in response to a change in temperature that places the thermochromic material at a temperature equal to or below a predetermined temperature value; and wherein the predetermined temperature value of the thermochromic material on the first thermochromic clip is higher than the predetermined temperature value of the thermochromic material on the second thermochromic clip.

In accordance with yet another form of the present invention, there is provided a kit for providing a visual indication of the temperature of the air flowing through an air vent as refrigerant is introduced into an air conditioning system, wherein the kit includes a first thermochromic clip and a second thermochromic clip, and each of the first and second thermochromic clips including an elongate body having an outer facing surface; a fastening member on the elongate body, and the fastening member being sized and configured for selective attachment to the air vent; and at least the outer facing surface of the elongate body being coated with a thermochromic material; and the thermochromic material of the outer facing surface being structured and disposed for changing from a first color state to a second color state in response to a change in temperature that places the thermochromic material at a temperature equal to or below a predetermined temperature value; wherein the predetermined temperature value of the thermochromic material on the first thermochromic clip is higher than the predetermined temperature value of the thermochromic material on the second thermochromic clip; a canister having an outer wall surrounding an inner cavity, and the inner cavity being filled with a charge of refrigerant; a hose member surrounding a channel and having first and second open ends, and the first open end being connected to the canister such that the channel is in fluid flow communication with the inner cavity; a control on the canister that is selectively operable between an open position for permitting flow of the refrigerant from the inner cavity into the channel and through the second open end of the hose member and a closed position for preventing flow of the refrigerant through the channel; a coupler member on the hose member that is sized and configured for coupling the second open end of the hose member with the air conditioning system; and first and second receptacles on the canister each being sized and configured for selective receipt of one of the first and second thermochromic clips.

In yet another form of this invention, there is provided a thermochromic clip for providing a visual indication of the temperature of the air flowing through an air vent. The thermochromic clip includes an elongate body having an outer facing surface. A fastening member is provided on the elongate body. The fastening member is sized and configured for selected attachment to the air vent. At least the outer facing surface of the elongate body is coated with a thermochromic material. The thermochromic material of the outer facing surface is structured and disposed for changing from a first color state to a second color state in response to a change in temperature that places the thermochromic material at a temperature equal to or below a predetermined value.

In still another form of this invention, there is provided a device for providing visual indication of the temperature of the air flowing through an air vent as refrigerant is introduced into an air conditioning system. The device includes an outer facing surface and a fastening member. The fastening member is sized and configured for selective attachment to or near the air vent. At least the outer facing surface of the device is coated with a thermochromic material. The thermochromic material of the outer facing surface is structured and disposed for changing from a first color state to a second color state in response to a change in the temperature that places the thermochromic material at a temperature equal to or below a predetermined value.

BRIEF DESCRIPTION OF THE DRAWINGS

For a fuller understanding of the nature, of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the thermochromic clip of the present invention is shown and is generally indicated as 10. In one embodiment, one or more thermochromic clips 10 are used in conjunction with a thermochromic refrigerant canister 18 as part of a kit for providing a visual indication of the temperature of the air flowing through an air vent 100 as refrigerant is introduced into an air conditioning system, such as an automobile air conditioning system. As used herein, the term "automobile" includes any motorized vehicle.

Figure 1A:
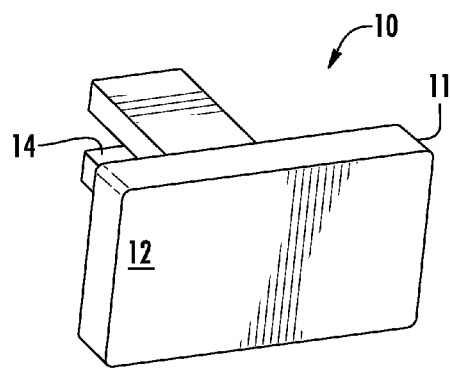
FIG. 1A is perspective view of the thermochromic clip of the present invention in accordance with one embodiment.
Figure 1B:
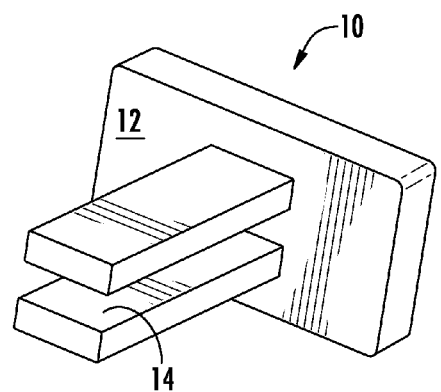
FIG. 1B is perspective view of the thermochromic clip of the present invention in accordance with one embodiment.

Referring to FIGS. 1A and 1B, a thermochromic clip 10 includes an elongate member 11 having an outer surface coating 12 made from a thermochromic material, such as thermochromic ink or paint. Alternatively, the thermochromic material may be injected into the elongate member 11 that is at least partially transparent. A fastener 14, such as a two-pronged clasp, is included on the elongate member 11. In one embodiment, the fastener 14 includes outer surface coating 12 made from a thermochromic material.

Figure 2:
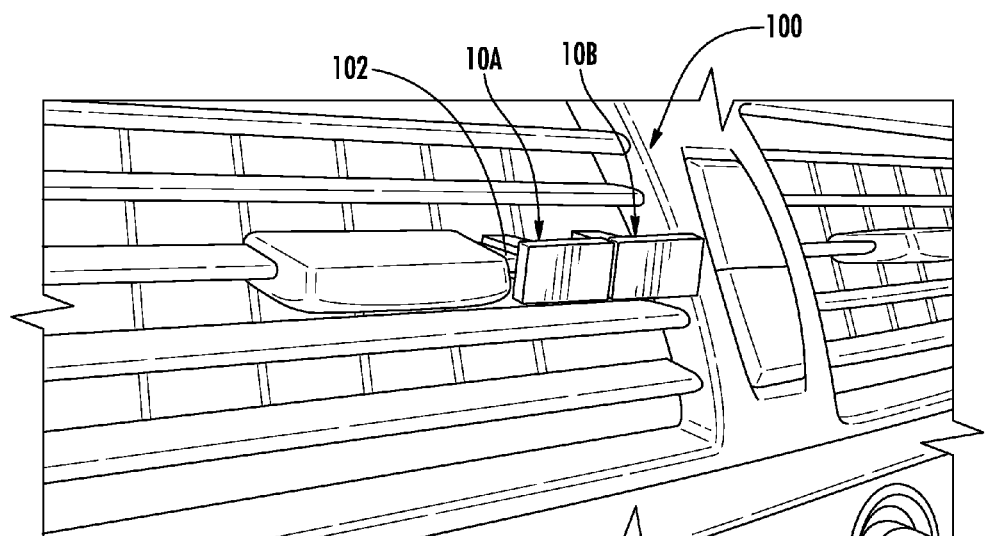
FIG. 2 is a perspective view of air conditioning vent having first and second thermochromic clips secured thereto.

Referring to FIG. 2, first and second thermochromic clips 10A and 10B are shown secured to air vent 100, such as an automobile air conditioning vent, wherein the fastener 14 is secured to an air vent vane 102 on air vent 100, in one embodiment, as shown in the drawings, the fastener 14 is a two-pronged clasp sized for grasping around and holding onto an air vent vane 102.

The outer surface coating 12 on each of the first and second thermochromic clips 10A and 10B is at least partially made from a thermochromic material that is designed to change from a first color state, or pigment, to a second color state, or pigment, in response to a change in temperature and, more particularly, in response to a change in temperature placing the thermochromic material at a predetermined temperature value. In a preferred embodiment, the thermochromic clip 10 is made from a plastic substrate; however, any other suitable material may be used as well.

In one embodiment, the respective outer surface coatings 12 for each of the first and second thermochromic clips 10A and 10B are structured and disposed to change from a first color state to a second color state at different, predetermined temperatures, wherein clip 10A changes color state at a higher temperature than clip 10B as each of the clips 10A and 10B become colder. In a preferred embodiment, clip 10A changes from a first color state to a second color state when the temperature cools to a predetermined temperature value selected for indicating that refrigerant is actively being introduced to the air conditioning system. Similarly, in a preferred embodiment, clip 10B changes from a first color state to a second color state when the temperature cools to a predetermined temperature value selected for indicating that the refrigerant has reached its fully charged, optimum fill level within the air conditioning system. By way of a non-limiting example, the outer surface coating 12 of thermochromic clip 10A may be structured and disposed to change from a first color state to a second color state at a temperature of 60° F. or lower and the outer surface coating 12 of thermochromic clip 10B may be structured and disposed to change from a first color state to a second color state at a temperature of 50° F. or lower. Accordingly, in the example above, thermochromic clip 10A is in a first color state at temperatures above 60° F. and a second color state at temperatures 60° F. and below, while thermochromic clip 10A is in a first color state at temperatures above 50° F. and a second color state at temperatures 50° F. and below.

Figure 3A:
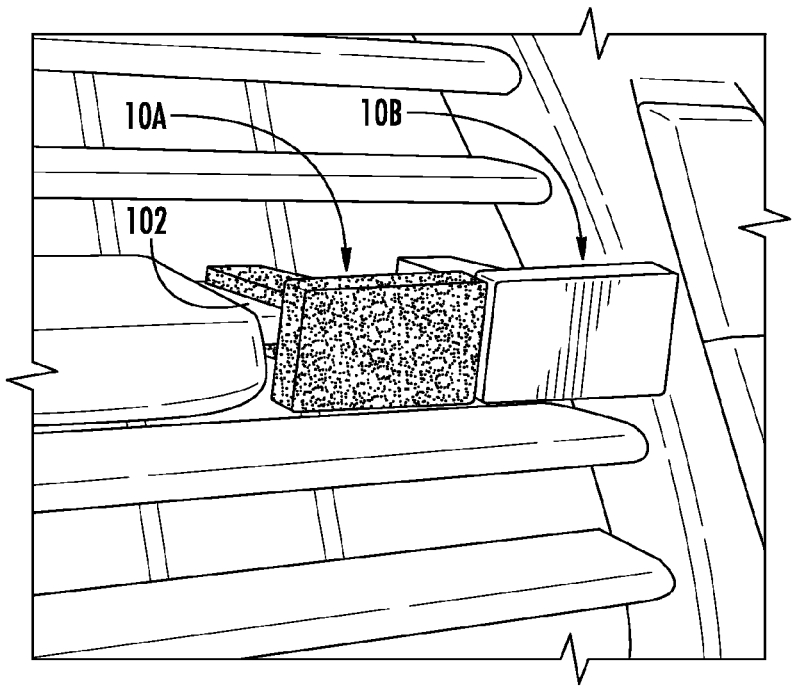
FIG. 3A is a perspective view of air conditioning vent having first and second thermochromic clips secured thereto, wherein the first thermochromic clip has changed color.
Figure 3B:
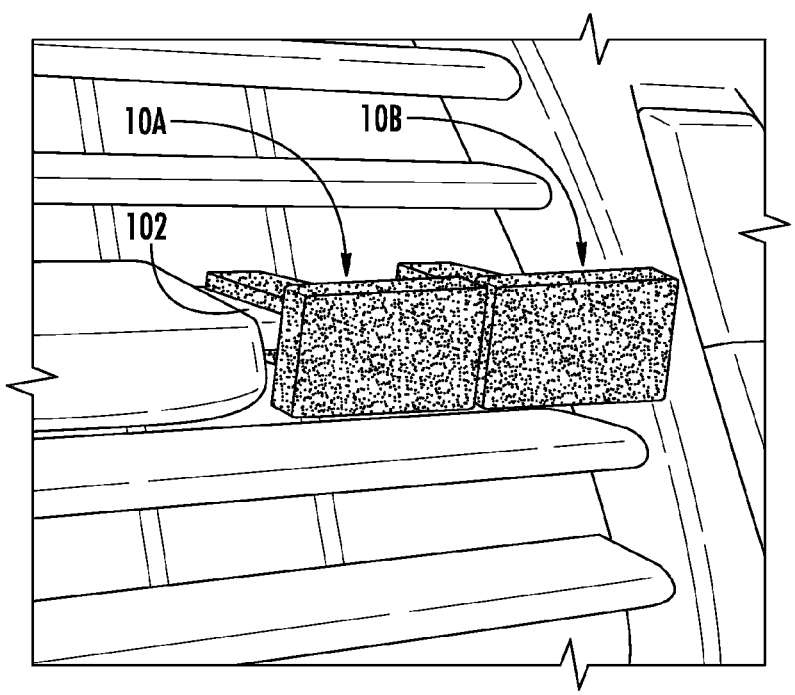
FIG. 3B is a perspective view of air conditioning vent having first and second thermochromic clips secured thereto, wherein each of the first and second thermochromic clips have changed color.

In operation, as refrigerant is introduced to the air conditioning system, cold air flows through the air vents 100 at a rate as selectively determined by a user, it is preferable for the air vent 100 to be set to permit cold airflow through the air vent 100 at its highest setting in order to most effectually determine when the refrigerant has reached the optimum fill level. As shown in FIG. 3A, the outer surface coating 12 of thermochromic clip 10A changes from a first color state to a second color state while the outer surface coating 12 of thermochromic clip 10B remains in the first color state. As the refrigerant approaches optimum fill level, the air flowing through the air vent will become colder and the outer surface coating 12 of thermochromic clip 10B changes from a first color state to a second color state, as shown in FIG. 3B.

Figure 4:
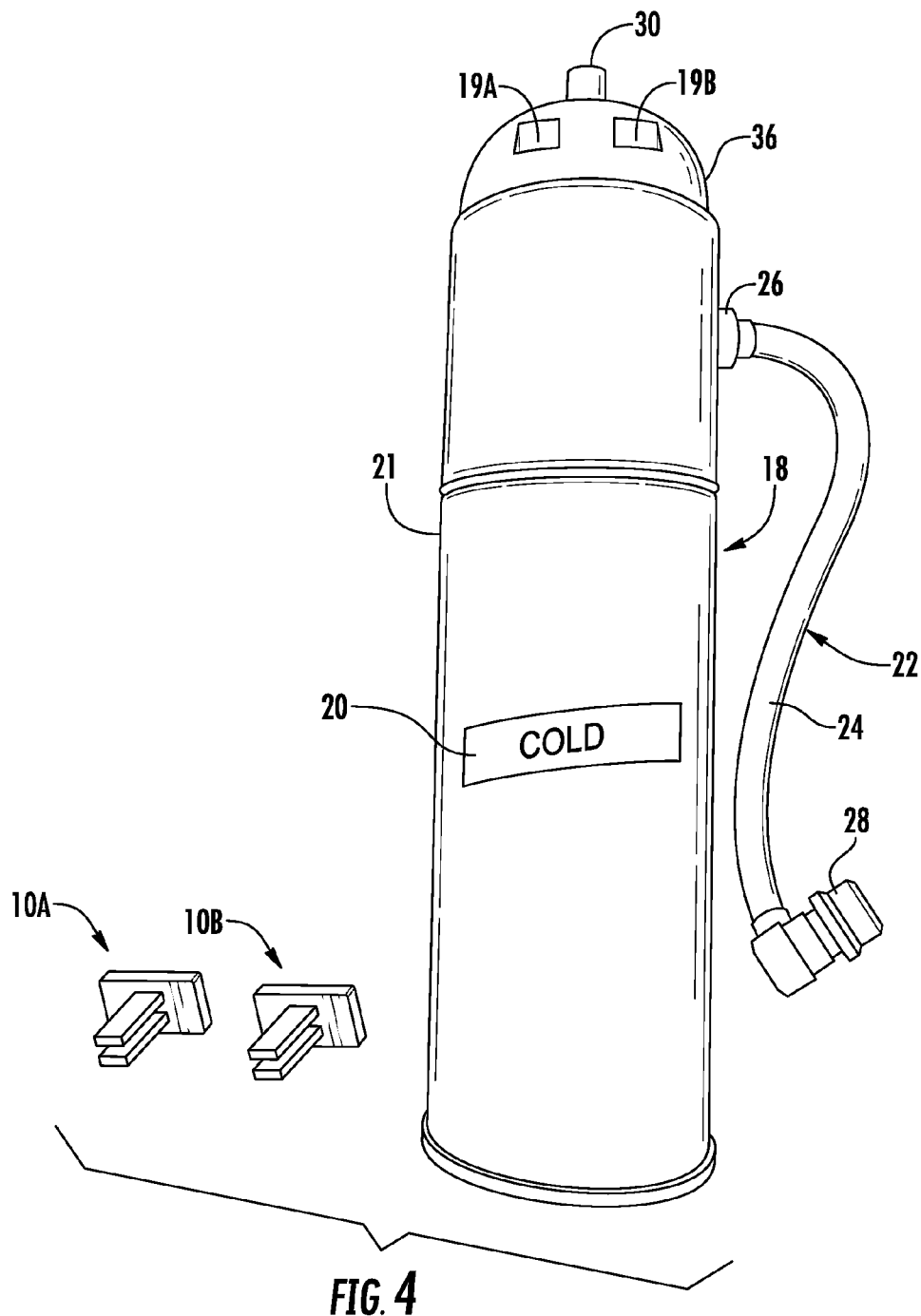
FIG. 4 is a perspective view of a kit including first and second thermochromic clips and a thermochromic refrigerant canister.
Figure 5:
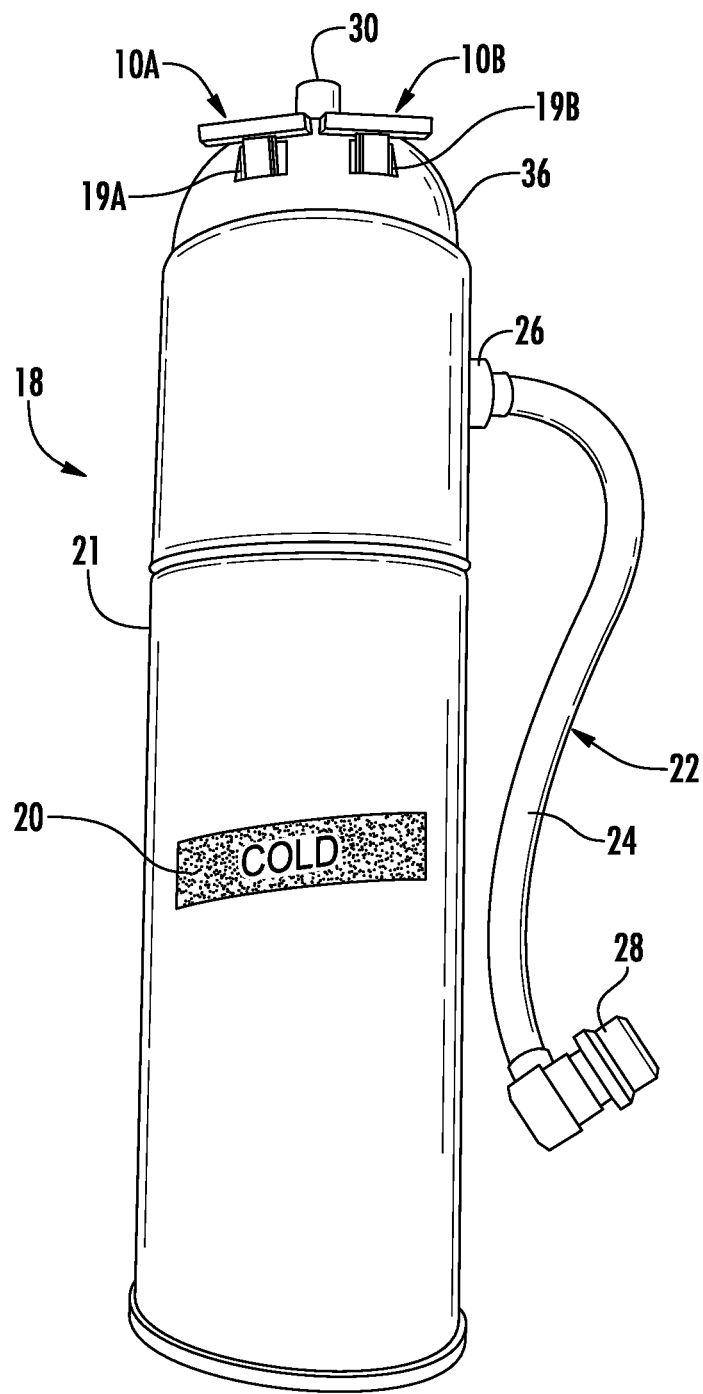
FIG. 5 is a perspective view of the thermochromic refrigerant canister.

Referring to FIGS. 4 and 5, a kit is shown including a canister 18 for use in conjunction with first and second thermochromic clips 10A and 10B as described above. The canister 18 includes an outer wall 21 surrounding an inner cavity filled with a charge of refrigerant. First and second receptacles 19A and 19B on the canister 18 are each sized and configured for selective receipt of a respective one of the first and second thermochromic clips 10A and 10B. A hose member 22 is formed by a flexible tubular member 24 surrounding a channel between first and second open ends. The first open end of flexible tubular member 24 is connected to the canister 18 by connecting member 26 such that the channel is in fluid flow communication with the inner cavity of the canister 18. A coupler member 28 at the second end of the flexible tubular member 24 is provided for connecting with the air conditioning system and, more particularly, with the low-side service port of an automobile air conditioning system. Flow of refrigerant from the inner cavity into the channel and through the second open end of the hose member 22 at coupler member 28 is selectively operable using a control 30, such as a twistable knob in communication with a valve on the canister 18.

Referring still to FIGS. 4 and 5, the outer wall 21, or at least a portion thereof, of the canister 18 may include a surface coating 20 including thermochromic material that is structured and disposed for changing from a first color state to a second color state in response to a change in temperature that places the thermochromic material at a temperature equal to or below a predetermined temperature value in order to indicate cooling of the canister 18 as refrigerant exits the inner cavity of canister 18 when being introduced to the air conditioning system.

In one embodiment, the thermochromic material on the respective outer surface coatings 12 on each of the first and second thermochromic clips 10A and 10B is unique, such that clip 10A changes to a first color upon reaching the first predetermined temperature value while clip 10B changes to a second color state upon cooling to the second predetermined temperature value.

While the present invention has been shown and described in accordance with several preferred and practical embodiments, it is recognized that departures from the instant disclosure are contemplated within the spirit and scope of the present invention which are not limited except as defined in the following claims as interpreted by the Doctrine of Equivalents. For example, this invention is applicable to home and commercial air conditioners as well as automobile air conditioners.

What is claimed is:

1. A kit for providing a visual indication of the temperature of the air flowing through an air vent of an automobile, and said kit comprising:
   a first thermochromic clip and a second thermochromic clip, and each of said first and second thermochromic clips comprising:
   an elongate body having an outer facing surface;
   a fastening member on said elongate body, and said fastening member being sized and configured for selective attachment to the air vent; and
   at least the outer facing surface of the elongate body being coated with a thermochromic material; and said thermochromic material of said outer facing surface being structured and disposed for changing from a first color state to a second color state in response to a change in temperature that places said thermochromic material at a temperature equal to or below a predetermined temperature value;
   wherein the predetermined temperature value of said thermochromic material on said first thermochromic clip is higher than the predetermined temperature value of said thermochromic material on said second thermochromic clip;
   a canister having an outer wall surrounding an inner cavity, and said inner cavity being filled with a charge of refrigerant;
   a hose member surrounding a channel and having first and second open ends, and said first open end being connected to said canister such that said channel is in fluid flow communication with said inner cavity;
   a control on said canister that is selectively operable between an open position for permitting flow of the refrigerant from said inner cavity into said channel and through said second open end of said hose member and a closed position for preventing flow of the refrigerant through said channel;
   a coupler member on said hose member that is sized and configured for coupling said second open end with the air conditioning system; and
   first and second receptacles on said canister each being sized and configured for selective receipt of one of said first and second thermochromic clips.

2. The kit as recited in claim 1 further comprising a surface coating on an outer facing surface of said outer wall of said canister, and said surface coating including said thermochromic material that is structured and disposed for changing from a first color state to a second color state in response to a change in temperature that places said thermochromic material at a temperature equal to or below a predetermined temperature value.

3. The kit as recited in claim 2 wherein the predetermined temperature value of said thermochromic material on said second thermochromic clip is selected from a range between 45° F. and 55° F.

4. The kit as recited in claim 2 wherein the predetermined temperature value of said thermochromic material on said canister is selected for visually indicating a flow of the refrigerant therefrom.

5. The kit as recited in claim 1 wherein the predetermined temperature value of said thermochromic material on said first thermochromic clip is selected for visually indicating a flow of the refrigerant being introduced into the air conditioning system.

6. The kit as recited in claim 5 wherein the predetermined temperature value of said thermochromic material on said second thermochromic clip is selected for visually indicating an optimum fill level of refrigerant in the air conditioning system.

7. The kit as recited in claim 1 wherein the predetermined temperature value of said thermochromic material on said first thermochromic clip is selected from a range between 60° F. and 70° F.

8. The kit as recited in claim 1 wherein the predetermined temperature value of said thermochromic material on said first thermochromic clip is 60° F.

9. The kit as recited in claim 8 wherein the predetermined temperature value of said thermochromic material on said second thermochromic clip is 50° F.

* * * * *